(12) United States Patent
Alexandrov

(10) Patent No.: US 9,351,073 B1
(45) Date of Patent: *May 24, 2016

(54) ENHANCED STEREO PLAYBACK

(75) Inventor: Sergei P. Alexandrov, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 198 days.

This patent is subject to a terminal disclaimer.

(21) Appl. No.: 13/528,619

(22) Filed: Jun. 20, 2012

(51) Int. Cl.
| | |
|---|---|
| H04R 5/00 | (2006.01) |
| H04B 15/00 | (2006.01) |
| H04B 1/00 | (2006.01) |
| H04R 5/02 | (2006.01) |
| G10K 11/16 | (2006.01) |

(52) U.S. Cl.
CPC ........ H04R 5/00 (2013.01); G10K 11/16 (2013.01); H04B 1/00 (2013.01); H04B 15/00 (2013.01); H04R 5/02 (2013.01)

(58) Field of Classification Search
CPC ...... H04R 1/0141; H04R 1/06; H04R 1/1091; H04R 1/1083; H04R 3/00; H04R 3/002; H04R 3/005; H04R 3/04; H04R 2460/01; H04R 2201/109; H04R 2201/107; H04R 2410/05; H04R 2420/03; H04R 25/43; H04R 5/03; H04R 5/04; H04R 5/00; H04S 7/30; H04S 7/302; H04S 7/303; H04S 7/307; H04S 7/00; H04S 7/305; H04S 7/308; H04S 3/00; H04S 3/002; H04S 3/004; H04S 3/008; H04S 1/00; H04S 1/007; H04S 2400/01; H04S 2400/15; H04S 2400/05; H04S 2420/01; H04S 2420/11; H04S 2420/13; G10K 11/002; G10K 11/175; G10K 11/178; G10K 11/16; G10K 15/08; G10K 2210/1081; G10K 2210/3014; G10K 2210/3048; G10K 2210/3055; G10K 11/1786; H03G 3/00; H03G 3/20; H03G 5/00; H03G 5/16; G10L 21/0208; G10L 19/26; G10L 2021/02082; G10H 1/0033; G10H 2210/265; G10H 5/07; G10H 7/008
USPC .............. 381/1, 11, 12, 13, 17, 18, 23.1, 300, 381/302, 303, 309, 310, 26, 27, 61, 317, 381/318, 71.1, 71.6, 71.11, 74, 79, 93, 94.1, 381/98, 99, 100, 110, 119, 66
See application file for complete search history.

(56) References Cited

U.S. PATENT DOCUMENTS

| | | | |
|---|---|---|---|
| 6,243,476 B1 * | 6/2001 | Gardner ............... | H04S 1/007 |
| | | | 381/1 |
| 6,449,368 B1 * | 9/2002 | Davis et al. ............ | 381/1 |

(Continued)

OTHER PUBLICATIONS

"Non-Final Office Action dated Jun. 20, 2014", for U.S. Appl. No. 13/528,646 (18 pages).

(Continued)

Primary Examiner — Leshui Zhang
(74) Attorney, Agent, or Firm — Polsinelli LLP

(57) ABSTRACT

Systems and methods in accordance with various embodiments of the present disclosure overcome one or more deficiencies in conventional approaches to stereo playback. In particular, various embodiments attempt to cancel or reduce the sound distortion and/or noise from "crosstalk signals" such that stereo effect can be maintained and/or enhanced. In some embodiments, the various embodiments attempt to reduce and/or compensate for the loss of low frequency (bass) sound signals. Moreover, a listener's position, such as his/her head position, can be tracked such that the enhanced stereo playback can be maintained if the listener changes position.

21 Claims, 10 Drawing Sheets

(56) References Cited

U.S. PATENT DOCUMENTS

2007/0230743 A1* 10/2007 Mannerheim ...... G06K 9/00234
382/103
2010/0027799 A1 2/2010 Romesburg et al.
2012/0128166 A1 5/2012 Kim et al.

OTHER PUBLICATIONS

"Final Office Action dated Dec. 5, 2014", for U.S. Appl. No. 13/528,646 (19 pages).

* cited by examiner

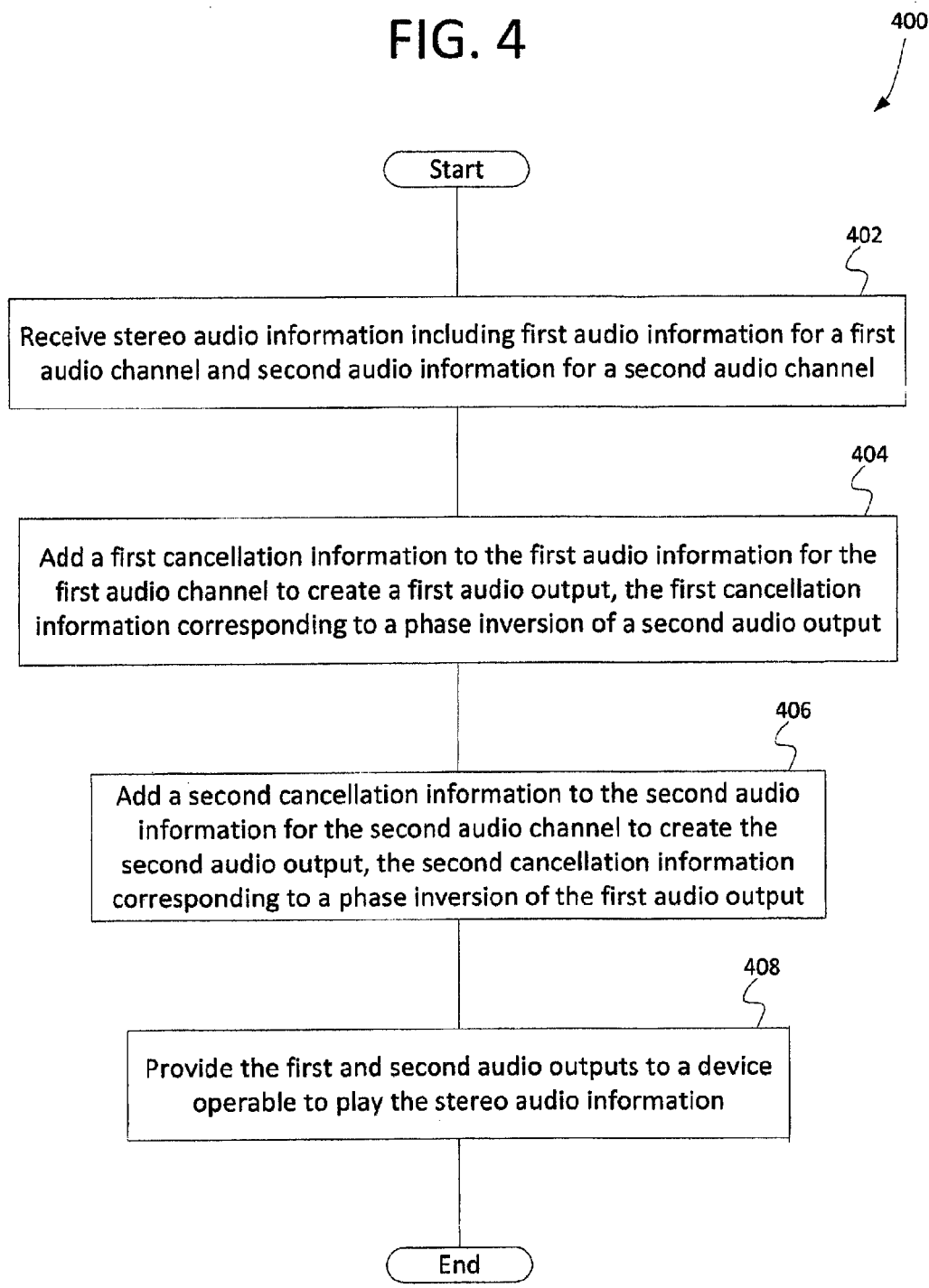

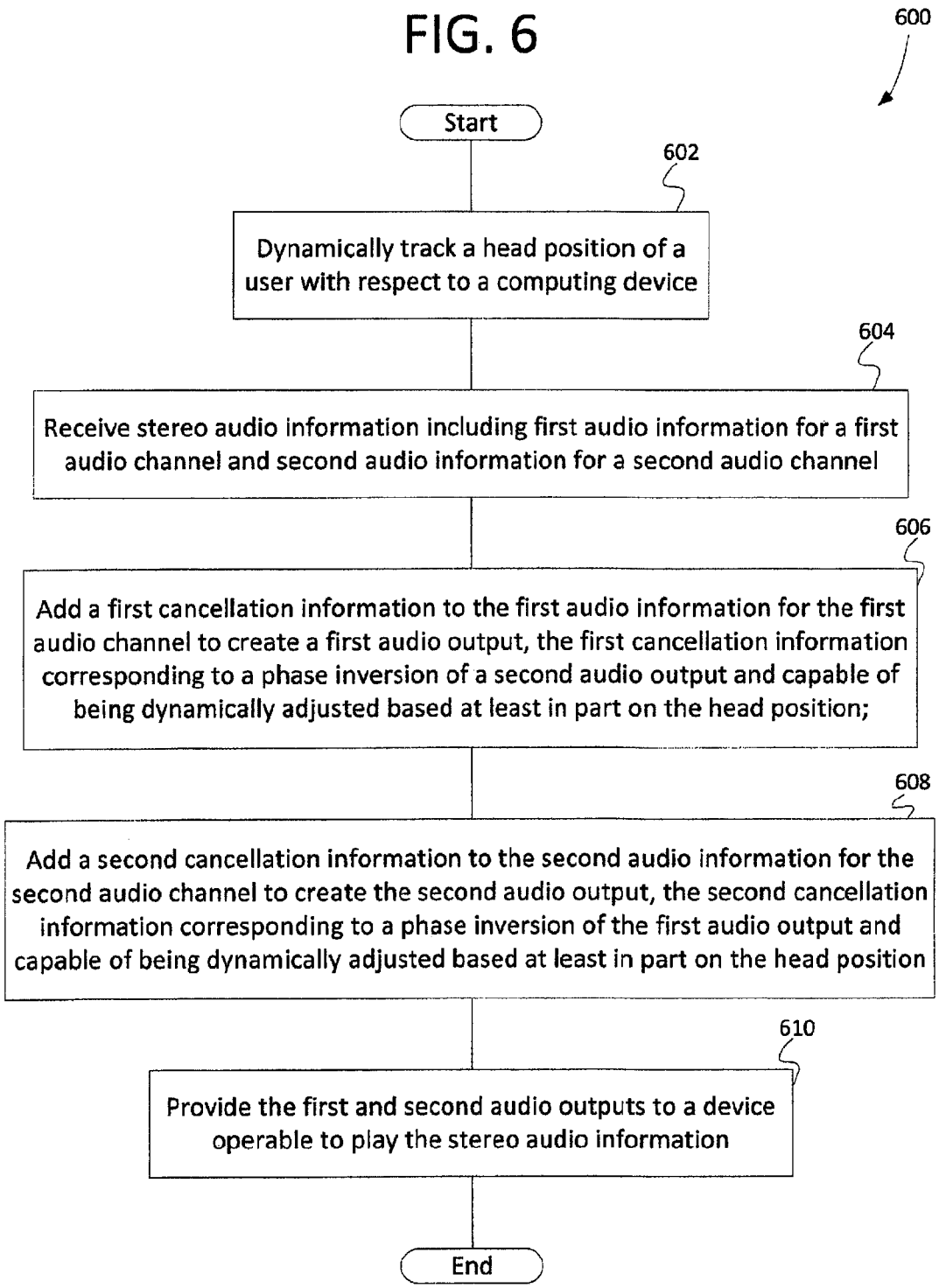

ENHANCED STEREO PLAYBACK

BACKGROUND

Users are increasingly utilizing electronic computing devices for entertainment purposes. For example, a user of a computing device can watch a movie or television, play games, surf the Internet, etc. on the computing device. The user can also listen to music, an audio book, a podcast, the radio, etc. on the computing device. In addition to entertainment, the user can use the computing device for various other purposes, such as communication purposes including making telephone calls, video chatting, engaging in web cam sessions or web conferences, etc. Sometimes the user may want to use the audio speakers of the computing device. For example, a user watching a movie or television on a tablet computing device may wish to use the speakers of the tablet rather than headphones. Similarly, a user engaging in a video call on a smartphone may wish to use the speakers of the smartphone for convenience. Moreover, a user may use a laptop to watch online streaming video from the Internet without using headphones. Whatever the case, audio playback is often meant to be stereo. However, the sound quality of stereo playback from the speakers of a computing device may not be as good as that from external speakers separate from the computing device. For conventional stereo playback, the quality of the perceived playback depends at least in part on the distance between two speakers (e.g., left and right speakers). As the distance between the two speakers decrease (e.g., as is the case with smaller computing devices), the playback sound quality decreases as well and the listener (i.e., user) may end up perceiving stereo playback practically as mono.

BRIEF DESCRIPTION OF THE DRAWINGS

Various embodiments in accordance with the present disclosure will be described with reference to the drawings, in which:

FIG. 4 illustrates an example method embodiment for enhanced stereo playback;

FIG. 6 illustrates an example method embodiment for enhanced stereo playback with listener position tracking;

DETAILED DESCRIPTION

Figure 1:
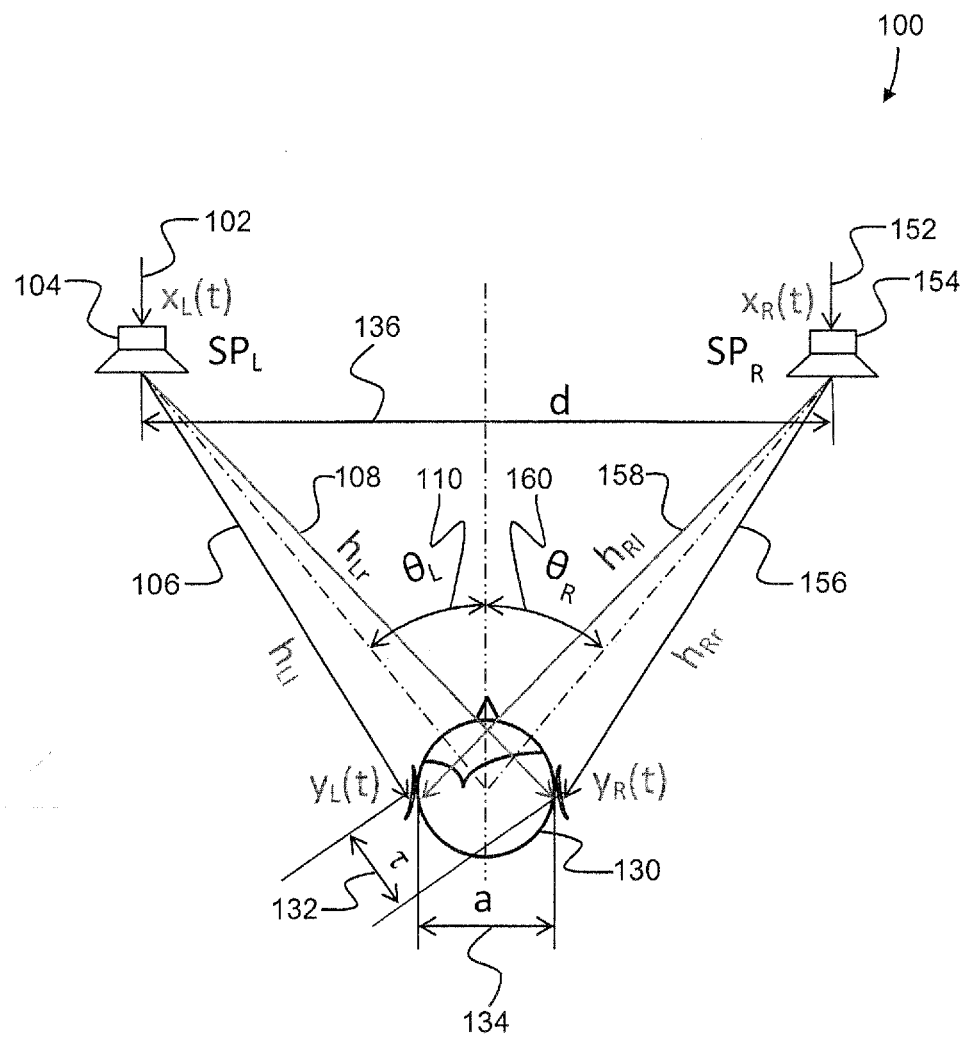
FIG. 1 illustrates an example environment in which aspects of the various embodiments can be utilized.

Systems and methods in accordance with various embodiments of the present disclosure overcome one or more of the above-referenced and other deficiencies in conventional approaches. In particular, various embodiments attempt to cancel or reduce the sound distortion and/or noise from "crosstalk signals" such that stereo effect can be maintained and/or enhanced. Moreover, a listener's position, such as his/her head position, can be tracked such that the enhanced stereo playback can be maintained if the listener changes position.

In general, conventional stereo playback uses a sound system with at least two speakers (e.g., left and right speakers). Stereo audio is typically split into two or more channels (e.g., left and right), for example, one for each of the speakers. The audio of the left channel is typically played through the left speaker and the audio of the right channel through the right speaker. Ideally, the left channel audio played through the left speaker should be heard by a listener's left ear and the right channel audio by his/her right ear (the left and right channel audio signals reaching the user's left and right ears, respectively, can be called "direct signals"). This results in a strong stereo effect in the playback.

Sometimes, however, at least a portion of the left channel audio from the left speaker reaches the listener's right ear while a portion of the right channel audio from the right speaker reaches the listener's left ear (the left and right channel audio signals reaching the right and left ears, respectively, can be called "crosstalk signals"). In other words, sometimes the listener's left ear hears the left channel audio mixed with some right channel audio, while his/her right ear hears the right channel audio mixed with some left channel audio. This can significantly reduce the stereo effect. Nevertheless, if the distance between the left and right speakers is great (assuming the listener is in between the speakers), then the listener's left ear may hear the left channel audio sufficiently well and his/her right ear the right channel audio, with minimal crosstalk, resulting in a stereo playback of acceptable quality. If, however, the distance between the left and right speakers is small, then each of the listener's ears may hear the signal from the opposite speaker, thereby losing spatial information and reducing the stereo effect. As computing devices become smaller in size, the distance between the speakers of the computer devices will necessarily become smaller as well, resulting in spatial information loss and the listener perceiving stereo playback as practically mono.

In some embodiments, spatial information loss can be reduced by using acoustical crosstalk cancellation approach. For example, there can be an attempt to reduce each crosstalk signal by creating (e.g., synthesizing) cancellation signals, each cancellation signal being created to be similar to one crosstalk signal but with a phase inverse to that of the respective crosstalk signal. Each cancellation signal created (e.g., synthesized) with an inverse phase to its respective crosstalk signal can cancel or reduce the effects of its respective crosstalk signal.

For example, in some embodiments, there can be a stereo input signal split into left and right channels, resulting in left and right channel input signals. The left channel input signal can be combined with a cancellation signal (e.g., a left cancellation signal) to produce a left channel output signal. The right channel input signal can be combined with another cancellation signal (e.g., a right cancellation signal) to produce a right channel output signal. The left cancellation signal can be generated by adding a delay, filter, and/or a phase inverter to the right channel output signal. Similarly, the right cancellation signal can be generated by adding a delay, filter, and/or phase inverter to the left channel output signal. As such, each output signal can be recursively generated by each respective input signal and cancellation signal, while each output signal can also simultaneously help to generate the cancellation signal for the opposite channel. As a result, the output signal from each channel includes not only its respective original input signal, but also a cancellation signal to cancel or reduce the crosstalk signal from the output of the opposite channel.

In some embodiments, the cancellation signals can be adjusted depending at least in part on the position of the user (e.g., listener). For example, a user can be sitting on a couch watching an action movie with a strong stereo effect on his/her tablet computing device, which can be placed in a stationary position directly in front of the user on a coffee table. When the tablet computing device is directly in front of the user, the user will likely be in a center position relative to the left and right speakers of the tablet computing device. If the user leans left or right, he/she will no longer be in the center position relative to the speakers. In other words, the user will have changed his/her position, now being either closer to the left speaker or to the right. This change in position can be tracked by the computing device (e.g., using one or more cameras, infrared sensors, microphones, etc.). The computing device can determine the change in the position (e.g., head position) of the user. Based on the position change, one or more adjustments to the cancellation signal for each channel can be implemented such that the stereo effect is maintained. For example, if the cancellation signal is generated by utilizing at least a delay or filter, then the delay or filter can be adjusted based on (e.g., correlating to) the user's position change so that the cancellation signal will still work with the user's changed position. Various other functions and advantages are described and suggested below as may be provided in accordance with the various embodiments.

FIG. 1 illustrates an example environment 100 in which aspects of the various embodiments can be utilized. In some embodiments, the example environment 100 can include a left channel audio input signal 102 (denoted as $x_L(t)$), a left speaker 104 (denoted as $SP_L$), a left channel audio output signal having a portion 106 (denoted as $h_{Ll}$) being heard by a user's (e.g., 130) left ear and a portion 108 (denoted as $h_{Lr}$) being heard by the user's right ear. The delay 132 between the time at which the portion 106 can be heard by the user's left ear and the time at which the portion 108 can be heard by the user's right ear can be denoted as τ. The angle 110 between the median of the left channel audio output signal and the user's centered frontward position can be denoted as $\sigma_L$. Similarly, there can be a right channel audio output signal 152 (denoted as $x_R(t)$), a right speaker 154 (denoted as $SP_R$), a right channel audio output signal having a portion 156 (denoted as $h_{Rr}$) that can be heard by the user's right ear and a portion 158 (denoted as $h_{Rl}$) that can be heard by his/her left ear. The delay 132 between portions 156 and 158 can also be denoted as τ. The angle 160 between the median of the right channel audio output signal and the user's centered frontward position can be denoted as $\sigma_R$. The distance 134 between the user's left and right ears can be denoted as a. The distance 136 between the left and right speakers, 104 and 154 respectively, can be denoted as d. As the distance between the two or more speakers decreases (e.g., as is the case with smaller computing devices), the playback sound quality decreases as well and the listener (i.e., user) might end up perceiving stereo playback practically as mono playback.

In some embodiments, the left and right speakers, 104 and 154 respectively, can be ideal or close to ideal speakers in that they can convert input signals (e.g., electrical input signals) into output signals (e.g., acoustical output signals) with little or no distortion (e.g., including linear and/or non-linear distortion). The left channel audio input signal 102 can be output through the left speaker 104 and at least a portion 106 (e.g., direct signal) of the output can reach the user's left ear while, due to diffraction for example, at least a portion 108 (e.g., crosstalk signal) of the output can reach the user's right ear. Similarly, the right channel audio input signal 152 can be output through the right speaker 154; the output can include at least a portion 156 (e.g., direct signal) that can reach the user's right ear and at least a portion 158 (e.g., crosstalk signal) that can reach the user's left ear. As such, each of the user's ears can hear a direct signal mixed with a crosstalk signal.

For example, in some embodiments, the total combined audio that can be heard by the user's left ear can be denoted as $y_L(t)$, where $y_L(t)=x_L(t)*h_{Ll}(t)+x_R(t-\tau)*h_{Rl}(t)$, and the total combined audio that can be heard by the user's right ear can be denoted as $y_R(t)$, where $y_R(t)=x_R(t)*h_{Rr}(t)+x_L(t-\tau)*h_{Lr}(t)$. The * operator can denote convolution between the x and h functions.

The functions $h_{Ll}(t)$ and $h_{Rr}(t)$ are the impulse responses for direct signal paths (e.g., the portion 106 from the left speaker 104 that reaches the left ear and the portion 156 from the right speaker 154 that reaches the right ear, respectively). The functions $h_{Lr}(t)$ and $h_{Rl}(t)$ are the impulse responses for crosstalk signal paths (e.g., the portion 108 from the left speaker 104 that reaches the right ear and the portion 158 from the right speaker 154 that reaches the left ear, respectively). The functions $x_L(t)$ and $x_R(t)$ can represent the left channel audio input signal 102 and right channel audio input signal 152, respectively. Moreover, $x_L(t-\tau)$ can be the function for the left channel audio input signal 102 offset by a delay τ so as to take into account the delay between the time the left channel audio output (e.g., direct signal) can reach user's left ear and the time the left channel audio output (e.g., crosstalk signal) can reach the right ear. The function $x_R(t-\tau)$ can be the function for the right channel audio input signal 152 offset by a delay τ so as to take into account the delay between the time the right channel audio output (e.g., direct signal) can reach user's right ear and the time the right channel audio output (e.g., crosstalk signal) can reach the left ear. The convolution $x_R(t-\tau)*h_{Rl}(t)$ corresponds to the crosstalk signal from the right speaker 152), which can cause noise and/or distortion in the user's left ear. Likewise, the convolution $x_L(t-\tau)*h_{Lr}(t)$ (e.g., corresponding to the crosstalk signal from the left speaker 102) can cause noise/distortion in the user's right ear. As a result, there can be spatial information loss and the user can experience a reduction in the quality of stereo playback.

Figure 2:
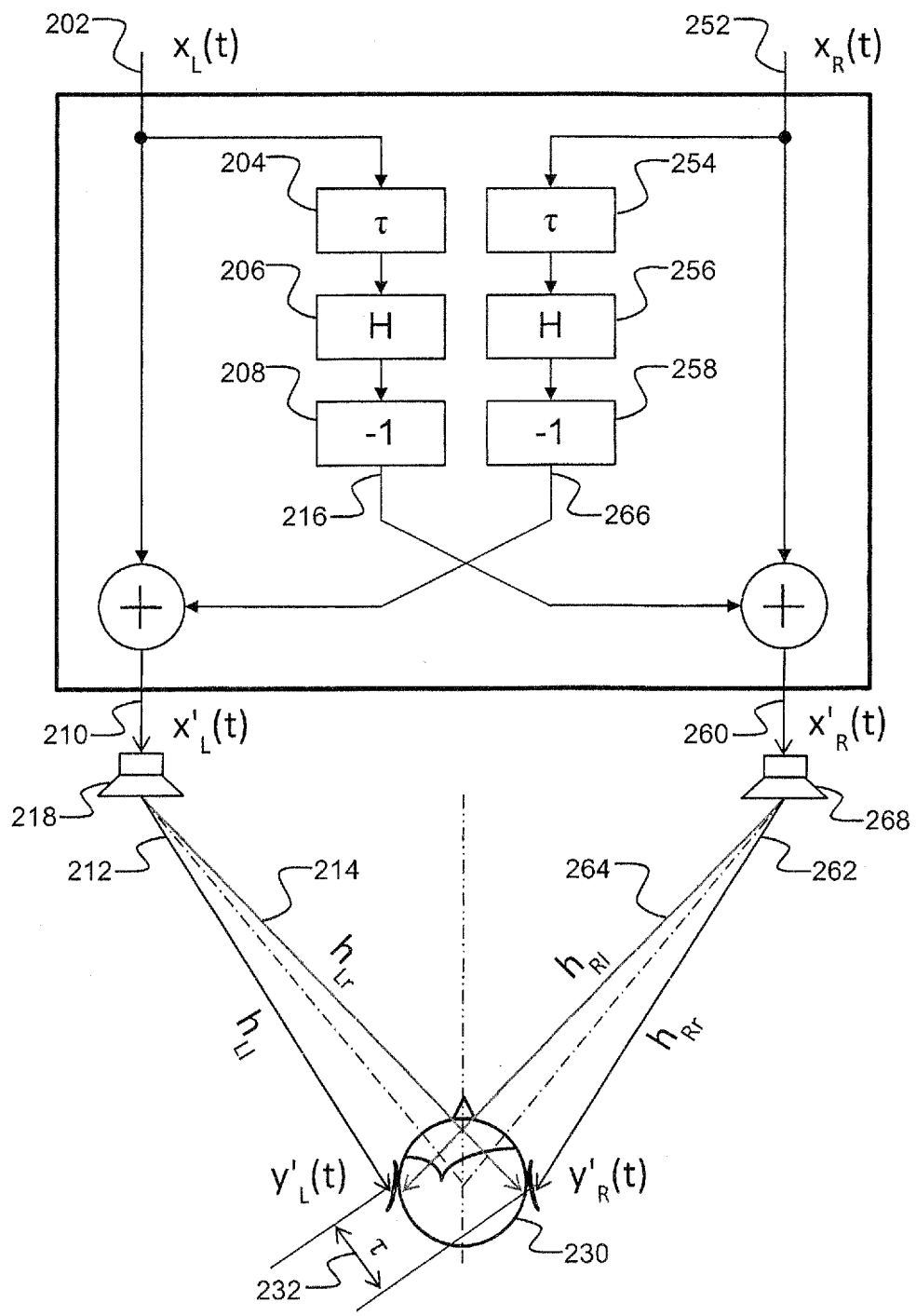
FIG. 2 illustrates a conventional approach for attempting to reduce stereo quality loss during playback.

FIG. 2 illustrates a conventional approach for attempting to reduce stereo quality loss during playback. The conventional approach tries to reduce or prevent spatial information loss by using "single" acoustical crosstalk cancellation. Various implementations of conventional approaches can be derived from the conventional approach shown in FIG. 2. The conventional solution of FIG. 2 attempts to reduce or eliminate the $x_R(t-\tau)*h_{Rl}(t)$ crosstalk signal by forming (e.g., creating, generating, synthesizing) a similar crosstalk signal with an inverse phase and combining the formed (e.g., created, generated, synthesized) inverse phase crosstalk signal with an original stereo input signal. The same is done for the $x_L(t-\tau)*h_{Lr}(t)$ crosstalk signal.

In the conventional approach shown in FIG. 2, audio input signals 202 and 252 are used to generate cancellation signals 216 and 266, respectively. The left channel audio input signal 202 is delayed 204, filtered 206, and has its phase inverted 208 to create a cancellation signal 216 for reducing or cancelling the crosstalk signal 214 from the left speaker that can reach a user's right ear (e.g., the right ear of the user 230). The cancellation signal 216 is (combined with the original right channel audio input signal 252 to form a right channel audio output signal 260 and) outputted through the right speaker 268 such that the cancellation signal 216 can reach the user's right ear (e.g., via 262) to reduce or cancel the crosstalk signal 214 from the left speaker 218. Likewise, the right channel audio input signal 252 is used to create a cancellation signal 266 for reducing or cancelling the effects of the crosstalk signal 264 that can reach the user's left ear from the right speaker 268. The cancellation signal 252 is created by delaying 254, filtering 256, and inversing the phase 258 of the right channel audio input signal 252. The cancellation signal 252 is combined with the original left channel audio input signal 202 to form the left channel audio output signal 210. The left channel audio output signal 210 is outputted through the left speaker 218. The left channel audio output signal 210 comprises the cancellation signal 266 and reaches the user's left ear (e.g., via 212) to reduce or cancel the effects of the crosstalk signal 264 from the right speaker 268.

However, the conventional approach shown in FIG. 2 has some disadvantages. First, the cancellation signal from a speaker on one side, intended to reduce/cancel the crosstalk signal reaching that side, can also reach the opposite side. In other words, for example, the cancellation signal 216 (part of the right channel output signal 260 played through the right speaker 268) not only reaches the user's right ear via 262 to try to reduce/cancel the crosstalk signal 214, but the cancellation signal 216 also reaches the user's left ear via 264. In a parallel fashion, the cancellation signal 266 reaches not only the user's left ear via 212 in attempt to reduce/cancel the crosstalk signal 264, but the cancellation signal 266 also reaches the user's right ear via 214. This can cause noise and/or distortion, thereby reducing the quality of the stereo playback.

Moreover, if bass (low frequency) signals are played using the conventional approach for long periods of time, there can also be decreases in the stereo playback quality. Bass signals are low frequency, and the left and right channel bass signals of stereo recordings are usually the same. Due to the long periods of time low frequency bass signals are played and the relatively short absolute time shift in delaying (e.g., τ), the inverse phase signal mixing can cause a noticeable low frequency drop in the processed audio output signal. In other words, if the input signals are equal (e.g., $x_L(t)=x_R(t)$), then the conventional approach using single crosstalk cancellation algorithm can correspond to the standard "comb" filtering, which can result in ups and downs in the output audio signal thereby reducing the quality of the stereo playback.

Figure 3:
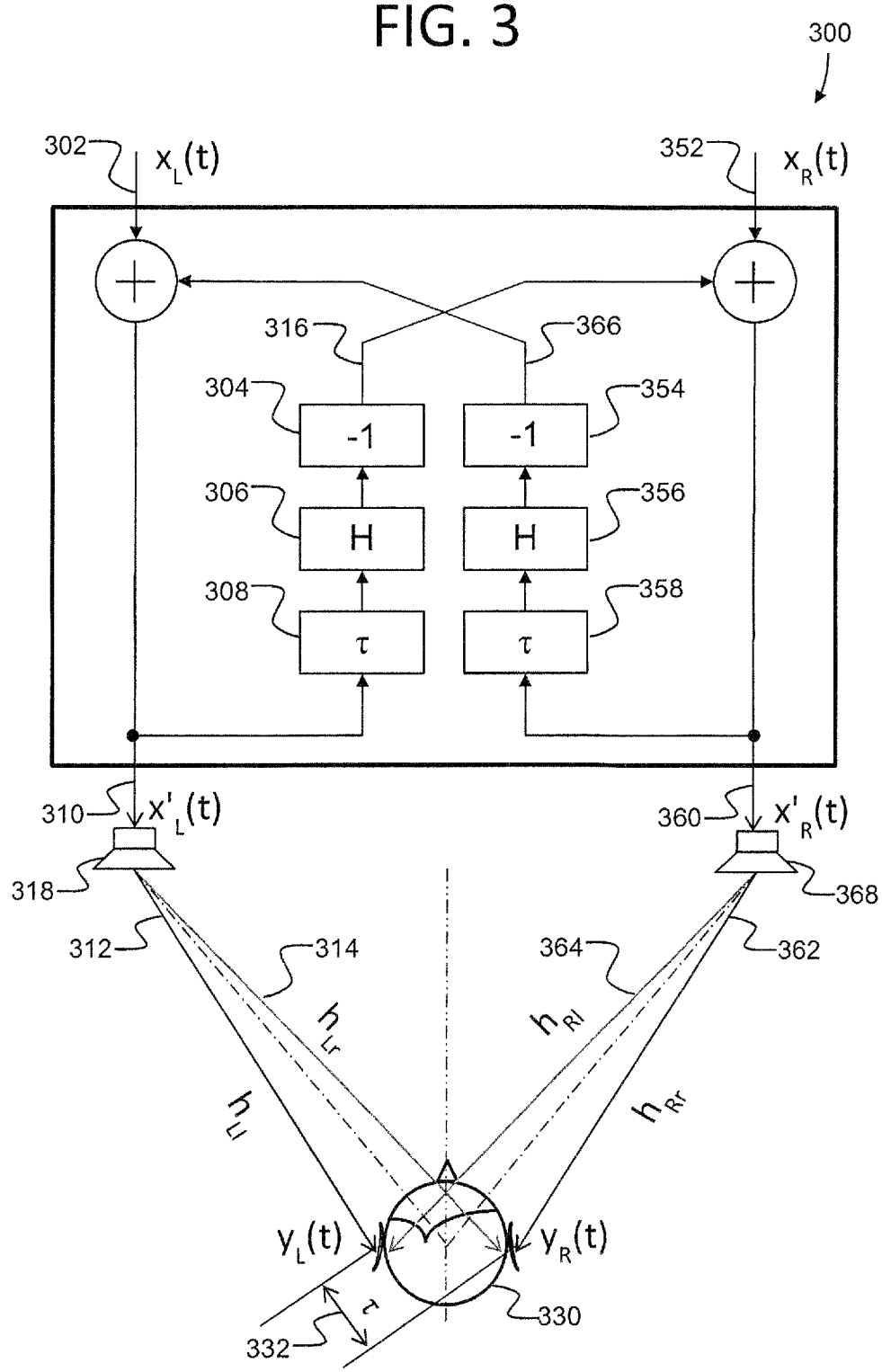
FIG. 3 illustrates an example system embodiment for enhanced stereo playback.

FIG. 3 illustrates an example system embodiment 300 for enhanced stereo playback. The example system embodiment 300 in FIG. 3 and other various embodiments in accordance with the present disclosure can overcome one or more of the above-referenced and other deficiencies in conventional approaches. In some embodiments, the example system embodiment 300 for enhanced stereo playback comprises a left channel audio input signal 302, a left channel audio output signal 310, a cancellation signal 316 generated based at least in part on the left channel audio output signal 310, a left speaker 318, a left channel audio output portion 312 that can reach (e.g., be heard by) a user's 330 left ear, and a left channel audio output portion 314 that can reach the user's right ear. The example embodiment 300 can also comprise a right channel audio input signal 352, a right channel audio output signal 360, a cancellation signal 366 generated based at least in part on the right channel audio output signal 360, a right speaker 368, a right channel audio output portion 362 that can reach the user's right ear, and a right channel audio output portion 364 that can reach the user's left ear.

In some embodiments, the example system 300 can use "infinite" crosstalk cancellation to enhance/maintain stereo playback and reduce/cancel noise and/or distortion. In some embodiments, the infinite crosstalk cancellation can create a cancellation signal(s) from an output(s) of an audio channel(s). For example, the cancellation signal 316 can be created from the left channel output signal 310 by adding modifications to the output signal 310, such as by modifying the output signal 310 with a delay 308, a filter 306, and a phase inversion 304. The created cancellation signal 316 can be combined with the original right channel audio input signal 352 to form the right channel audio output signal 360. Correspondingly, the cancellation signal 366 can be created by delaying 368, filtering 366, and inverting the phase 368 of the right channel audio output signal 360. The cancellation signal 366 can be combined with the original left channel input signal 302 to form the left channel output 310. In other words, the output of one channel can be modified and used to create a cancellation signal which is used to form the output of the other opposite channel.

As such, the cancellation signal 316 for reducing the left channel crosstalk signal 314 can be incorporated into the right channel output 360 to reach the user's right ear via 362, while the right channel crosstalk signal 364 can be reduced by the cancellation signal 366 which is incorporated into the left output 310 to reach the user's left ear via 312. The outputs 310 and 360 can be continuously (e.g., recursively) used to create/generate the cancellation signals 316 and 366, respectively, which are used to form the output signals 360 and 310, respectively. This cycle can repeat continuously resulting in infinite crosstalk cancellation.

In some embodiments, the filters (e.g., 306, 356) can utilize the transfer functions based on Fourier transformation. For example, a filter H (e.g., 306, 356) can be based at least in part on a Fourier transformation of h(t). A filter can be derived from $H(f)=F[h(t)]$ where F is the Fourier transform.

In some embodiments, the example embodiment 300 can have a structure that corresponds to an infinite impulse response (IIR) filter type. In some embodiments, the example embodiment 300 can correspond to an IIR filter that is converging and/or stable because the modulus /H/ is <1, which reflects a "shielding" effect user's head where the energy of the crosstalk signal is lower than the direct signal energy. In addition, the presence of a feedback signal (e.g., cancellation signal) compensates for loss in low frequencies (e.g., bass).

FIG. 4 illustrates an example method embodiment 400 for enhanced stereo playback. It should be understood that there can be additional, fewer, or alternative steps performed in similar or alternative orders, or in parallel, within the scope of the various embodiments unless otherwise stated. In some embodiments, the example method embodiment 400 can begin with receiving stereo audio information including first audio information for a first audio channel and second audio information for a second audio channel, at step 402. For example, the method 400 can receive stereo audio information including a left channel audio input signal and a right channel audio input signal.

In step 404, the example method 400 can add first cancellation information to the first audio information for the first audio channel to create a first audio output. The first cancellation information can correspond to a phase inversion of a second audio output. For example, the method can create a left channel audio output signal by combining a cancellation signal with the left channel audio input signal, wherein the cancellation signal is based at least in part on a phase inversion of a right channel audio output signal. In some embodiments, the first cancellation signal can also be based at least in part upon delaying and/or filtering the second audio output.

At step 406, the example method 400 can add second cancellation information to the second audio information for the second audio channel to create the second audio output, wherein the second cancellation information corresponds to a phase inversion of the first audio output. For example, the method can combine another (e.g., a second) cancellation signal with the right channel audio input signal to create the right channel audio output signal, wherein the another (e.g., second) cancellation signal is based at least in part upon a phase inversion of the left channel audio output signal. In some embodiments, the second cancellation signal can also be based at least in part upon modifying the first audio output by a delay and/or a filter.

The example method 400 can provide the first and second audio outputs to a device operable to play the stereo audio information, at step 408. For example, the method 400 can provide the left and right channel audio output signals to a computing device to play the stereo audio information.

In some embodiments, the example method 400 can provide for infinite crosstalk cancellation such that the quality of stereo playback can be enhanced and/or maintained even if the distance between the left and right speakers is small. In some embodiments, the effectiveness of the infinite crosstalk cancellation can depend in part on the head position of the user (i.e., listener) listening to the stereo playback.

Figure 5A:
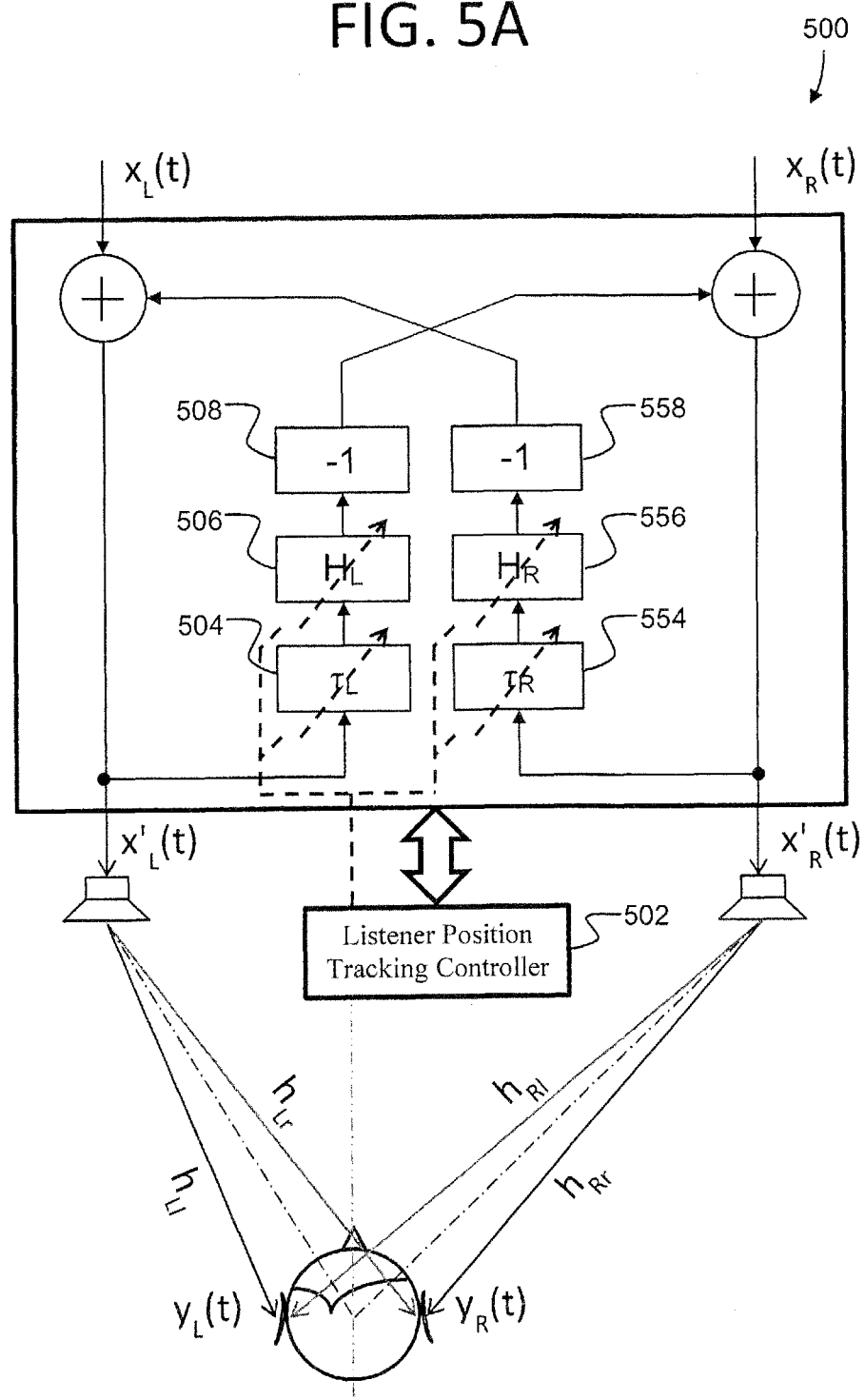
FIG. 5 illustrates an example system embodiment for enhanced stereo playback with listener position tracking.

FIG. 5A illustrates an example system embodiment 500 for enhanced stereo playback with listener position tracking. In some embodiments, the example system embodiment 500 can comprise a listener position tracking controller 502. The listener position tracking controller 502 can be part of the system embodiment or separate from, but communicative with, the system embodiment. The listener position tracking controller 502 is illustrated in more detail in FIG. 5B.

Figure 5B:
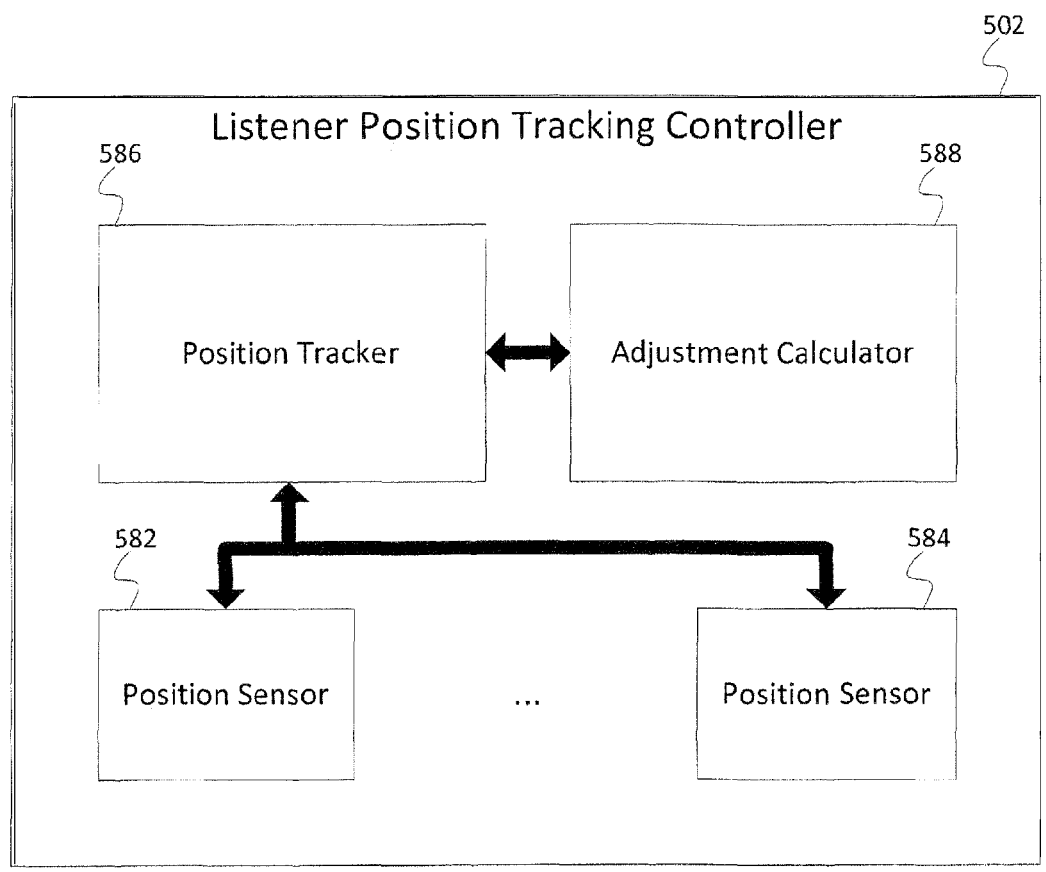

In some embodiments, the listener position tracking controller 502 as shown in FIG. 5B can comprise one or more position sensors (e.g., 582, 584), a position tracker 586, and an adjustment calculator 588. In some embodiments, the position tracker 586 and adjustment calculator 588 can operate together as a signal module. In some embodiments, a position sensor(s) can be used to gather data about a listener's position. A position sensor can be an instrument or device such as a camera, light sensor, infrared sensor, ultrasonic sensor, microphone(s), etc. For example, a camera position sensor(s) can obtain data about a head position of the user, data about a size of the user's head to determine positions of the user's left and right ears (and the distance between the ears, a), and/or data about the user's head rotation with respect to his/her shoulders. Also, if the user shifts his/her head to the left or right, the camera position sensor can obtain data about the changed head position of the user/listener.

In some embodiments, the data about the head position of the user can be used by the position tracker 586 to determine the user's head position (and presumably left and right ear positions). It for example, the user changes his/her head position, the change in head position can be tracked and/or determined by the position tracker 586. The data about the change in head position can be communicated to the adjustment calculator 588. For example, if the position tracker 586 determines that the user has shifted his/her head eight inches to the left, the position tracker 586 can communicate that information to the adjustment calculator 588.

In some embodiments, the adjustments calculator 588 can determine and/or calculate one or more adjustments that can be made to maintain infinite crosstalk cancellation while a user changes his/her head position. For example, if the adjustment calculator 588 receives information that the user has moved his/her head eight inches to the left, then the adjustment calculator 588 can determine how a delay(s) and/or filter(s) can be adjusted such that infinite crosstalk cancellation is maintained. In connection with FIG. 5A, the adjustments to the delays (e.g., 504, 554) and/or filters (e.g., 506, 556) determined by the adjustment calculator 588 can be communicated back to the system by the listener position tracking controller 502 in order to maintain infinite crosstalk cancellation.

FIG. 6 illustrates an example method embodiment 600 for enhanced stereo playback with listener position tracking. It should be understood that there can be additional, fewer, or alternative steps performed in similar or alternative orders, or in parallel, within the scope of the various embodiments unless otherwise stated. In some embodiments, the example method 600 can dynamically track a head position of a user with respect to a computing device, at step 602. For example, the method embodiment 600 can receive image information captured by a computing device, wherein the image includes at least a portion of a position of a user of the computing device. The method embodiment 600 can analyze the image information to determine a position of the user's head with respect to the computing device. At step 604, the example method 600 can receive stereo audio information including first audio information for a first audio channel and second audio information for a second audio channel.

At step 606, the example method 600 can add a first cancellation information to the first audio information for the first audio channel to create a first audio output. The first cancellation information can correspond to a phase inversion of a second audio output and can be dynamically adjusted based at least in part on the head position. For example, if the method 600 analyzes the image information captured by the computing device and determines that the position of the user's head has changed (e.g., shifted to the right), then the method can dynamically adjust the first cancellation signal such that stereo playback is maintained. To adjust the first cancellation signal, the method can, for example, analyze a change in the user's head position and appropriately modify a delay and/or a filter associated with the first cancellation information to continue infinite crosstalk cancellation and maintain the stereo playback.

At step 608, the example method 600 can add a second cancellation information to the second audio information for the second audio channel to create the second audio output, wherein the second cancellation information corresponds to a phase inversion of the first audio output and is capable of being dynamically adjusted based at least in part on the head position. For example, the method 600 can modify a delay and/or a filter for the second cancellation information depending upon the (change in the) user's head position.

The method embodiment 600 can provide the first and second audio outputs to a device operable to play the stereo audio information, at step 610. For example, a user/listener is watching a movie with strong stereo sound effects on his/her tablet computing device. As he/she moves his/her head (i.e., changes his/her head position), the method 600 (e.g., running on his/her tablet computing device) can track the change in his/her head position and calculate the appropriate adjustments to be made to the delays and/or filters such that infinite crosstalk cancellation retains its effectiveness and the stereo quality of the movie is enhanced/maintained even as the user moves his/her head.

Figure 7:
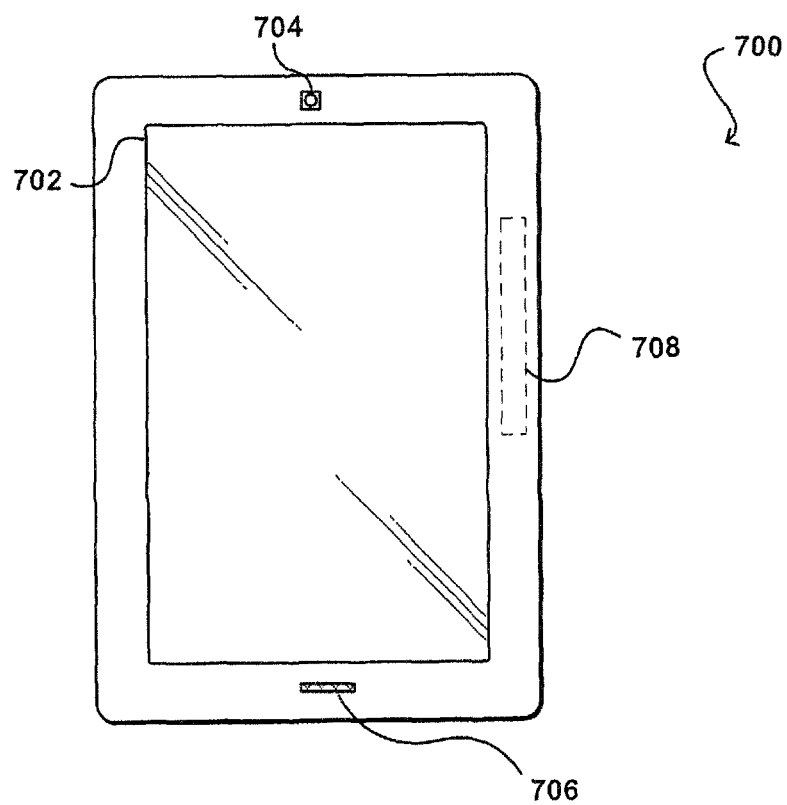
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
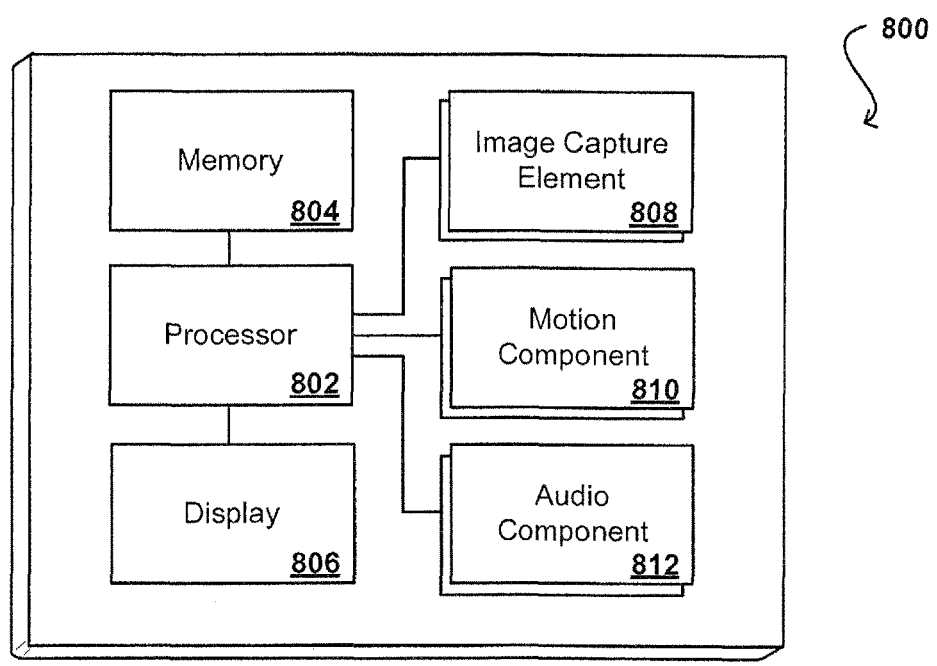
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
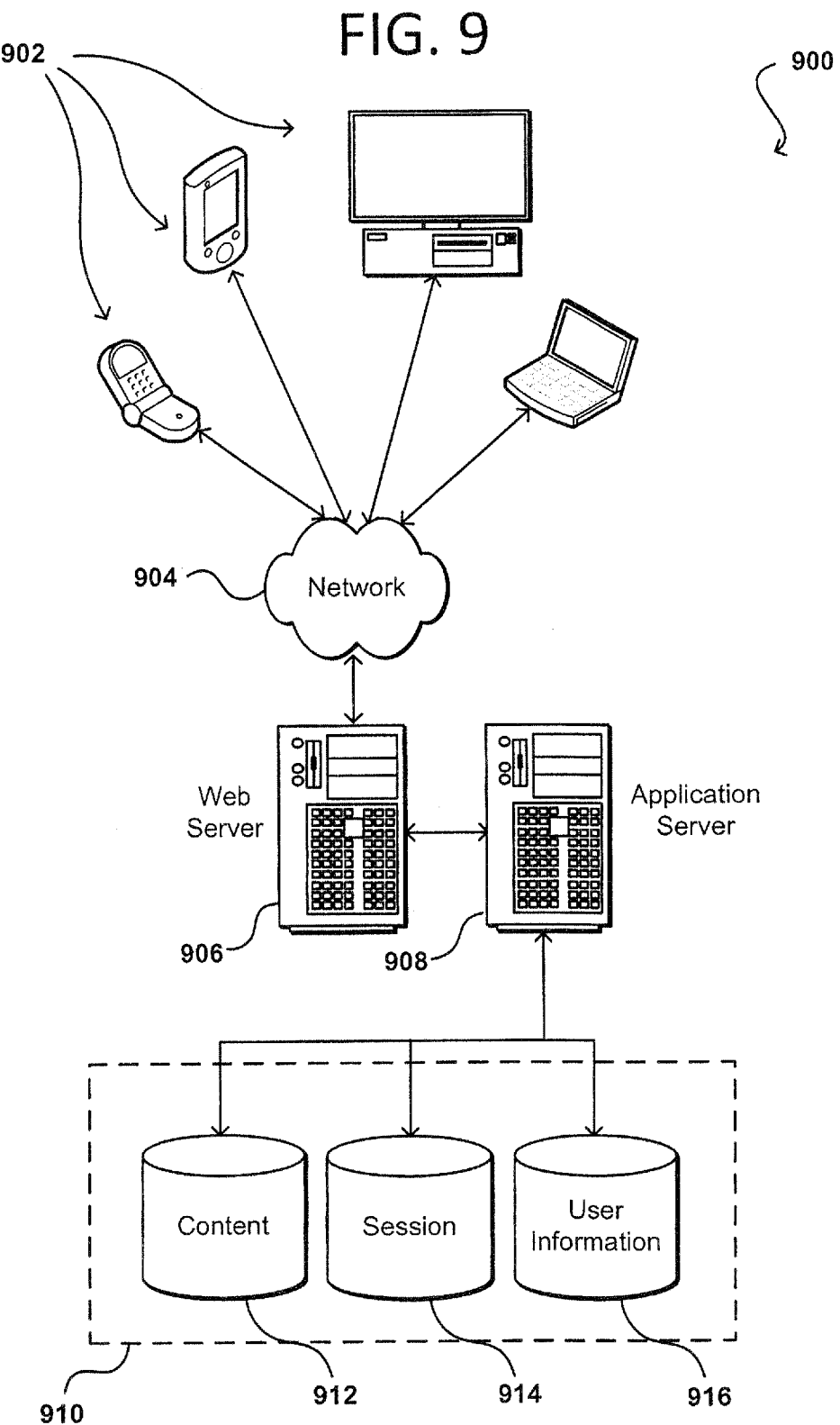
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C. C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a first left input audio signal corresponding to a left audio channel and a first right input audio signal corresponding to a right audio channel;
   receiving position information of a listener relative to a portable computing device;
   receiving orientation information of the portable computing device;
   generating a first left cancellation signal based at least in part on (a) at least one of a first phase inversion of a first right output audio signal, a first delay of the first right output audio signal, or a first filter of the right audio signal, (b) the position information of the listener, and (c) the orientation information of the portable computing device;
   generating a first right cancellation signal based at least in part on (a) at least one of a second phase inversion of a first left output audio signal, a second delay of the first left output audio signal, or a second filter of the left audio signal, (b) the position information of the listener, and (c) the orientation information of the portable computing device;
   modifying, using the first left cancellation signal, the first left input audio signal to generate a second left output audio signal;
   modifying, using the first right cancellation signal, the first right input audio signal to generate a second right output audio signal; and
   providing the second left output audio signal to the left audio channel and the second right output audio signal to the right audio channel.

2. The computer-implemented method of claim 1, wherein the second left output audio signal is used to generate a second right cancellation signal and the second right output audio signal is used to generate a second left cancellation signal.

3. The computer-implemented method of claim 1, wherein the first left cancellation signal reduces first crosstalk from the first right output audio signal and the first right cancellation signal reduces second crosstalk from the first left output audio signal.

4. The computer-implemented method of claim 3, wherein at least one of the first crosstalk or the second crosstalk includes at least one of a noise or a distortion.

5. A computer-implemented method, comprising:
receiving a stereo audio input including first left input audio information and first right input audio information;
receiving position information of a listener relative to a portable computing device;
receiving orientation information of the portable computing device;
generating first left cancellation information based at least in part on (a) at least one of at least one of a first phase inversion of first right output audio information, a first delay of the first right output audio information, or a first filter of the right audio information, (b) the position information of the listener, and (c) the orientation information of the portable computing device;
generating first right cancellation information based at least in part on (a) at least one of a second phase inversion of first left output audio information, a second delay of the first left output audio information, or a second filter of the left audio information, (b) the position information of the listener, and (c) the orientation information of the portable computing device;
modifying, using the first left cancellation information, the first left input audio information to generate second left output audio information;
modifying, using the first right cancellation information, the first right input audio information to generate second right output audio information; and
providing the second left output audio information and the second right output audio information as a stereo audio output.

6. The computer-implemented method of claim 5, wherein the second left output audio information is used to generate second right cancellation information and the second right output audio information is used to generate second left cancellation information.

7. The computer-implemented method of claim 5, wherein the first left input audio information is a left input signal corresponding to a left audio channel and the first right input audio information is a right input signal corresponding to a right audio channel.

8. The computer-implemented method of claim 7, wherein the first left input audio information is a first electrical audio input signal, the first right input audio information is a second electrical audio input signal, the second left output audio information is a first audio output signal for acoustical playback corresponding to the left audio channel, and the second right output audio information is a second audio output signal for acoustical playback corresponding to the right audio channel.

9. The computer-implemented method of claim 5, wherein each of the first left cancellation information and the first right cancellation information is further generated by using a respective filter based at least in part on a Fourier transformation represented by $H(f)=F[h(t)]$.

10. The computer-implemented method of claim 9, wherein the respective filter is configured to utilize at least in part infinite impulse response filtering.

11. The computer-implemented method of claim 10, wherein the infinite impulse response filtering converges and $|H(f)|<1$, resulting in stable filtering.

12. The computer-implemented method of claim 5, wherein the first left cancellation information compensates for losing one or more low frequency signals included in the second left output audio information and the first right cancellation information compensates for losing one or more low frequency signals included in the second right output audio information.

13. The computer-implemented method of claim 5, wherein the first left cancellation information reduces first crosstalk from the first right output audio information and the first right cancellation information reduces second crosstalk from the first left output audio information.

14. The computer-implemented method of claim 13, wherein at least one of the first crosstalk or the second crosstalk includes at least one of a noise or a distortion.

15. The computer-implemented method of claim 5, wherein the stereo audio input corresponds to at least one of an audio presentation or a video presentation with sound.

16. A portable computing device, comprising:
a processor; and
a memory device storing instructions that, when executed by the processor, cause the computing device to:
receive a stereo audio input including first left input audio information and first right input audio information;
receive position information of a listener relative to the portable computing device;
receive orientation information of the portable computing device
generate first left cancellation information based at least in part on (a) at least one of at least one of a first phase inversion of first right output audio information, a first delay of the first right output audio information, or a first filter of the right audio information, (b) the position information of the listener, and (c) the orientation information of the portable computing device;
generate first right cancellation information based at least in part on (a) at least one of a second phase inversion of first left output audio information, a second delay of the first left output audio information, or a second filter of the left audio information, (b) the position information of the listener, and (c) the orientation information of the portable computing device;
modify, using the first left cancellation information, the first left input audio information to generate second left output audio information;
modify, using the first right cancellation information, the first right input audio information to generate second right output audio information; and
provide the second left output audio information and the second right output audio information as a stereo audio output.

17. The portable computing device of claim 16, wherein the instructions cause the computing device to use the second left output audio information to generate second right cancellation information and to use the second right output audio information to generate second left cancellation information.

18. The portable computing device of claim 16, wherein the first left cancellation information reduces first crosstalk from the second right output audio information and the first right cancellation information reduces second crosstalk from the second left output audio information.

19. A non-transitory computer-readable storage medium including instructions for identifying elements, the instructions when executed by a processor of a portable computing device causing the portable computing device to:

receive a stereo audio input including first left input audio information and first right input audio information;

receive position information of a listener relative to the portable computing device;

generate first left cancellation information based at least in part on f(a) at least one of at least one of a first phase inversion of first right output audio information, a first delay of the first right output audio information, or a first filter of the right audio information, (b) the position information of the listener, and (c) the orientation information of the portable computing device;

generate first right cancellation information based at least in part on (a) at least one of a second phase inversion of first left output audio information, a second delay of the first left output audio information, or a second filter of the left audio information, (b) the position information of the listener, and (c) the orientation information of the portable computing device;

modify, using the first left cancellation information, the first left input audio information to generate second left output audio information;

modify, using the first right cancellation information, the first right input audio information to generate second right output audio information; and provide the second left output audio information and the second right output audio information as a stereo audio output.

20. The non-transitory computer-readable storage medium of claim 19, wherein the instructions cause the portable computing device to use the second left output audio information to generate second right cancellation information and to use the second right output audio information to generate second left cancellation information.

21. The non-transitory computer-readable storage medium of claim 19, wherein the first left cancellation information compensates for losing one or more low frequency signals included in the second left output audio information and the first right cancellation information compensates for losing one or more low frequency signals included in the second right output audio information.

* * * * *